(12) United States Patent
Bjørling et al.

(10) Patent No.: US 11,209,989 B2
(45) Date of Patent: Dec. 28, 2021

(54) ZONED NAMESPACES IN SOLID-STATE DRIVES

(71) Applicant: Western Digital Technologies, Inc., San Jose, CA (US)

(72) Inventors: Matias Bjørling, Copenhagen (DK); Horst-Christoph Georg Hellwig, Austria (DE); David Landsman, Mercer Island, WA (US); Daniel L. Helmick, Broomfield, CO (US); Liam Parker, Edinburgh (GB); Alan D. Bennett, Edinburgh (GB); Peter Grayson, Grand Rapids, MI (US); Judah Gamliel Hahn, Ofra (IL)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 13 days.

(21) Appl. No.: 16/728,917

(22) Filed: Dec. 27, 2019

(65) Prior Publication Data
US 2021/0089217 A1 Mar. 25, 2021

Related U.S. Application Data

(60) Provisional application No. 62/905,894, filed on Sep. 25, 2019.

(51) Int. Cl.
*G06F 3/06* (2006.01)
*G06F 12/02* (2006.01)
*G06F 11/20* (2006.01)

(52) U.S. Cl.
CPC .......... *G06F 3/0616* (2013.01); *G06F 3/064* (2013.01); *G06F 3/0631* (2013.01);
(Continued)

(58) Field of Classification Search
CPC .............. G06F 3/0616; G06F 12/0238; G06F 11/2094; G06F 3/064; G06F 3/0631;
(Continued)

(56) References Cited

U.S. PATENT DOCUMENTS 9,830,111 B1 * 11/2017 Patiejunas ............. G06F 3/0689
10,417,190 B1 * 9/2019 Donlan .................. G06F 16/10
(Continued)

FOREIGN PATENT DOCUMENTS

KR 20180130140 A 12/2018

OTHER PUBLICATIONS

International Search Report and the Written Opinion for International Application No. PCT/US2020/023413 dated Jul. 13, 2020, 10 pages.

*Primary Examiner* — Masud K Khan
*Assistant Examiner* — Trung-Hao Joseph Nguyen
(74) *Attorney, Agent, or Firm* — Patterson & Sheridan, LLP; Steven H. Versteeg

(57) ABSTRACT

The present disclosure generally relates to methods of operating storage devices. The storage device comprises a controller and a media unit. The capacity of the media unit is divided into a plurality of zones. The controller is configured to make informed use of errors by update zone metadata to indicate one or more first logical block addresses were skipped and to indicate the next valid logical block address is available to store data. The controller is further configured to update zone metadata to recommend to the host device to reset one or more full zones, to recommend to the host device to transition one or more open zones to a full state, to alert the host device that one or more open zones have been transitioned to the full state, and to notify the host device of the writeable zone capacity of each of the plurality of zones.

9 Claims, 4 Drawing Sheets

(52) U.S. Cl.
CPC .......... *G06F 3/0652* (2013.01); *G06F 3/0679* (2013.01); *G06F 11/2094* (2013.01); *G06F 12/0238* (2013.01); *G06F 2201/82* (2013.01); *G06F 2212/1036* (2013.01)

(58) Field of Classification Search
CPC .. G06F 3/0652; G06F 3/0679; G06F 2201/82; G06F 2212/1036
See application file for complete search history.

(56) References Cited

U.S. PATENT DOCUMENTS

| | | | |
|---|---|---|---|
| 10,990,526 B1 * | 4/2021 | Lam | G06F 12/0804 |
| 2009/0300082 A1 * | 12/2009 | Chen | G06F 12/023 |
| 2011/0261688 A1 | 10/2011 | Sharma et al. | |
| 2012/0155264 A1 | 6/2012 | Sharma et al. | |
| 2013/0254455 A1 | 9/2013 | Shim et al. | |
| 2014/0086070 A1 | 3/2014 | Saund et al. | |
| 2017/0038994 A1 * | 2/2017 | Ohhashi | G06F 3/0619 |
| 2017/0255399 A1 * | 9/2017 | Yang | G06F 3/064 |
| 2017/0286288 A1 * | 10/2017 | Higgins | G06F 11/1048 |
| 2018/0314431 A1 | 11/2018 | Rashid et al. | |
| 2019/0042343 A1 | 2/2019 | Khoueir et al. | |
| 2019/0146684 A1 | 5/2019 | Benisty et al. | |
| 2019/0258419 A1 | 8/2019 | Carey et al. | |
| 2021/0019083 A1 * | 1/2021 | Guo | G06F 11/1076 |

* cited by examiner

ZONED NAMESPACES IN SOLID-STATE DRIVES

CROSS-REFERENCE TO RELATED APPLICATIONS

This application claims benefit of U.S. provisional patent application Ser. No. 62/905,894, filed Sep. 25, 2019, which is herein incorporated by reference.

BACKGROUND OF THE DISCLOSURE

Field of the Disclosure

Embodiments of the present disclosure generally relate to storage devices, such as sold state drives (SSDs).

Description of the Related Art

Storage devices, such as SSDs, may be used in computers in applications where relatively low latency and high capacity storage are desired. For example, SSDs may exhibit lower latency, particularly for random reads and writes, than hard disk drives (HDDs). Typically, a controller of the SSD receives a command to read or write data from a host device to a memory device. The quantity of the memory device is referred to as a namespace, and the controller is configured to read data from or write data to the one or more namespaces of the memory device. Each namespace is comprised of a plurality of logical block addresses (LBAs) or sectors that correspond to a physical location of a media, such as erase blocks.

When a storage device experiences an error while writing data to erase blocks, such as I/O errors, charge leakage, and/or read/program disturbs, the storage device typically masks the error from the host device and manages the error on the backend. As such, the host device is unaware that an error occurred, and is no longer aware of the location where the data is stored. Moreover, some errors experienced by a storage device may result in one or more erase blocks being unable to store data. In such instances, the storage device has to read all the data from the erred erase blocks and re-write the data to a new set of erase blocks while still receiving commands from the host device, which can be expensive, reduce the total number of writes to the media, and degrade the overall performance of the storage device.

Thus, what is needed is a new method of operating a storage device.

SUMMARY OF THE DISCLOSURE

The present disclosure generally relates to methods of operating storage devices. The storage device comprises a controller and a media unit. The capacity of the media unit is divided into a plurality of zones. The controller is configured to make informed use of errors by update zone metadata to indicate one or more first logical block addresses were skipped and to indicate the next valid logical block address is available to store data. The controller is further configured to update zone metadata to recommend to the host device to reset one or more full zones, to recommend to the host device to transition one or more open zones to a full state, to alert the host device that one or more open zones have been transitioned to the full state, and to notify the host device of the writeable zone capacity of each of the plurality of zones.

In one embodiment, a storage device comprises a media unit. A capacity of the media unit is divided into a plurality of zones. The media unit comprises a plurality of dies, each of the plurality of dies comprising a plurality of erase blocks. The storage device further comprises a controller coupled to the media unit, the controller configured to update zone metadata to recommend to a host device to reset one or more full zones of the plurality of zones, update the zone metadata to recommend to the host device to transition one or more open zones of the plurality of zones to a full state, transition the one or more open zones to the full state, and update the zone metadata to alert the host device that the one or more open zones have been transitioned to the full state.

In another embodiment, a storage device comprises a media unit. A capacity of the media unit is divided into a plurality of zones. The media unit comprises a plurality of dies, each of the plurality of dies comprising a plurality of erase blocks. The storage device further comprises a controller coupled to the media unit, the controller configured to determine a writeable zone capacity of each of the plurality of zones, the writeable zone capacity being equal to or less than a total zone storage capacity of each zone, wherein the writeable capacity of each zone is aligned with a capacity of one or more erase blocks, and update zone metadata to notify a host device of the writeable zone capacity of each of the plurality of zones.

In one embodiment, a storage device comprises a media unit. A capacity of the media unit is divided into a plurality of zones. The media unit comprises a plurality of dies, each of the plurality of dies comprising a plurality of erase blocks. The storage device further comprises a controller coupled to the media unit, the controller configured to receive a write command to write data to one or more first logical block addresses in a first zone of the plurality of zones, upon experiencing an error while writing the data to the one or more first logical block addresses in the first zone, update a write pointer of the first zone to point to a next valid logical block address in the first zone; and update zone metadata to indicate the one or more first logical block addresses were skipped and to indicate the next valid logical block address is available to store the data in the first zone.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to methods of operating storage devices. The storage device comprises a controller and a media unit. The capacity of the media unit is divided into a plurality of zones. The controller is configured to make informed use of errors by update zone metadata to indicate one or more first logical block addresses were skipped and to indicate the next valid logical block address is available to store data. The controller is further configured to update zone metadata to recommend to the host device to reset one or more full zones, to recommend to the host device to transition one or more open zones to a full state, to alert the host device that one or more open zones have been transitioned to the full state, and to notify the host device of the writeable zone capacity of each of the plurality of zones.

Figure 1:
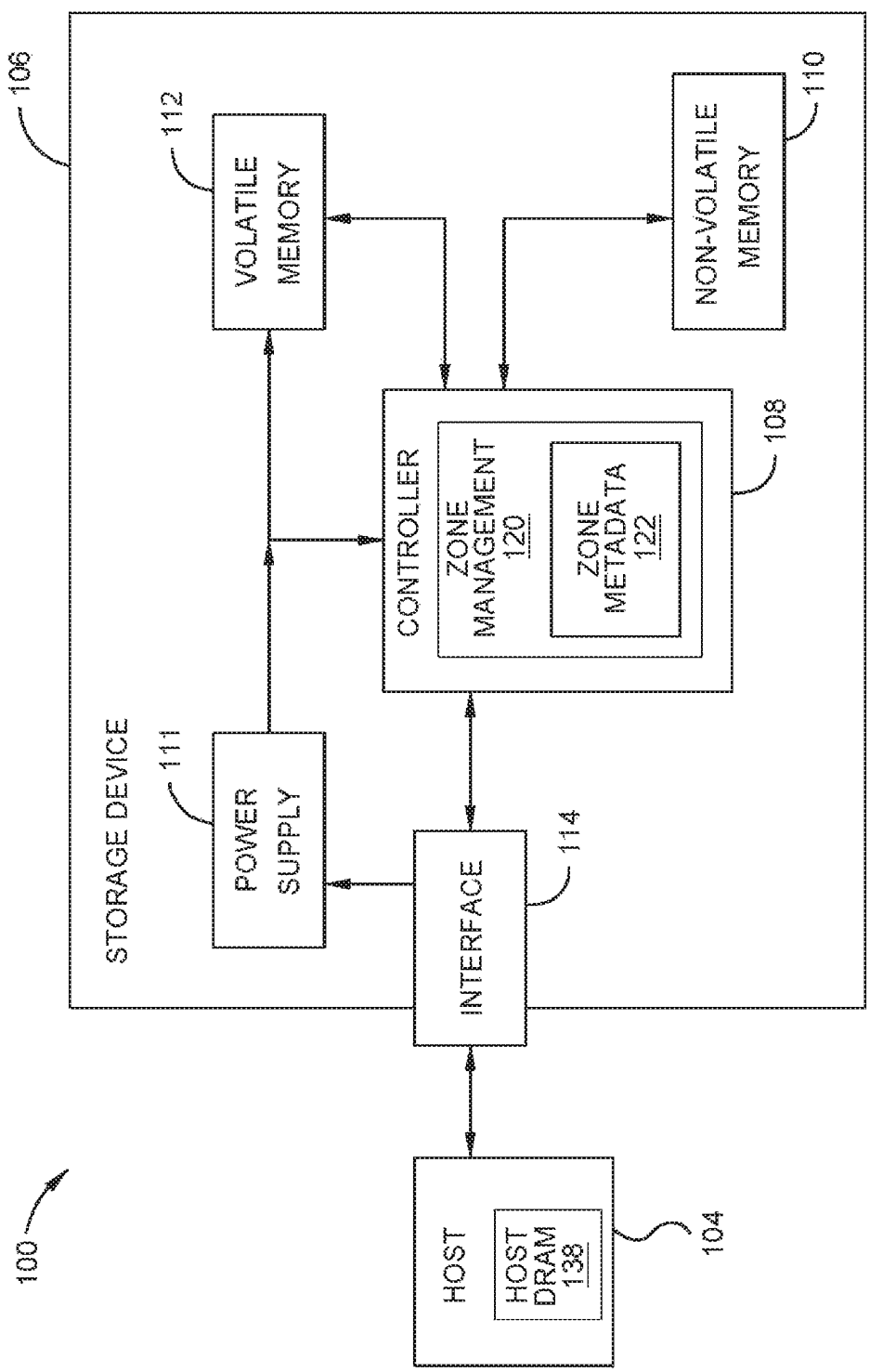
FIG. 1 is a schematic block diagram illustrating a storage system, according to one embodiment.

FIG. 1 is a schematic block diagram illustrating a storage system 100 in which storage device 106 may function as a storage device for a host device 104, in accordance with one or more techniques of this disclosure. For instance, the host device 104 may utilize non-volatile memory devices 110 included in storage device 106 to store and retrieve data. The host device 104 comprises a host DRAM 138. In some examples, the storage system 100 may include a plurality of storage devices, such as the storage device 106, which may operate as a storage array. For instance, the storage system 100 may include a plurality of storages devices 106 configured as a redundant array of inexpensive/independent disks (RAID) that collectively function as a mass storage device for the host device 104.

The storage system 100 includes a host device 104 which may store and/or retrieve data to and/or from one or more storage devices, such as the storage device 106. As illustrated in FIG. 1, the host device 104 may communicate with the storage device 106 via an interface 114. The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, and the like.

The storage device 106 includes a controller 108, non-volatile memory 110 (NVM 110), a power supply 111, volatile memory 112, and an interface 114. The controller 108 comprises a zone management 120. In some examples, the storage device 106 may include additional components not shown in FIG. 1 for sake of clarity. For example, the storage device 106 may include a printed circuit board (PCB) to which components of the storage device 106 are mechanically attached and which includes electrically conductive traces that electrically interconnect components of the storage device 106, or the like. In some examples, the physical dimensions and connector configurations of the storage device 106 may conform to one or more standard form factors. Some example standard form factors include, but are not limited to, 2.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the storage device 106 may be directly coupled (e.g., directly soldered) to a motherboard of the host device 104.

The interface 114 of the storage device 106 may include one or both of a data bus for exchanging data with the host device 104 and a control bus for exchanging commands with the host device 104. The interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), non-volatile memory express (NVMe), OpenCAPI, GenZ, Cache Coherent Interface Accelerator (CCIX), Open Channel SSD (OCSSD), Coherent Accelerator (CXL), or the like. The electrical connection of the interface 114 (e.g., the data bus, the control bus, or both) is electrically connected to the controller 108, providing electrical connection between the host device 104 and the controller 108, allowing data to be exchanged between the host device 104 and the controller 108. In some examples, the electrical connection of the interface 114 may also permit the storage device 106 to receive power from the host device 104. For example, as illustrated in FIG. 1, the power supply 111 may receive power from the host device 104 via the interface 114.

The storage device 106 includes NVM 110, which may include a plurality of memory devices. NVM 110 may be configured to store and/or retrieve data. For instance, a memory device of NVM 110 may receive data and a message from the controller 108 that instructs the memory device to store the data. Similarly, the memory device of NVM 110 may receive a message from the controller 108 that instructs the memory device to retrieve data. In some examples, each of the memory devices may be referred to as a die. In some examples, a single physical chip may include a plurality of dies (i.e., a plurality of memory devices). In some examples, each of the memory devices may be configured to store relatively large amounts of data (e.g., 128 MB, 256 MB, 412 MB, 1 GB, 2 GB, 3 GB, 8 GB, 16 GB, 22 GB, 54 GB, 128 GB, 256 GB, 412 GB, 1 TB, etc.).

In some examples, each memory device of NVM 110 may include any type of non-volatile memory devices, such as flash memory devices, phase-change memory (PCM) devices, resistive random-access memory (ReRAM) devices, magnetoresistive random-access memory (MRAM) devices, ferroelectric random-access memory (F-RAM), holographic memory devices, hard disk drives (HDD), and any other type of non-volatile memory devices.

The NVM 110 may comprise a plurality of flash memory devices. Flash memory devices may include NAND or NOR based flash memory devices, and may store data based on a charge contained in a floating gate of a transistor for each flash memory cell. In NAND flash memory devices, the flash memory device may be divided into a plurality of blocks which may divided into a plurality of pages. Each block of the plurality of blocks within a particular memory device may include a plurality of NAND cells. Rows of NAND cells may be electrically connected using a wordline to define a page of a plurality of pages. Respective cells in each of the plurality of pages may be electrically connected to respective bit lines. Furthermore, NAND flash memory devices may be 2D or 2D devices, and may be single level cell (SLC), multi-level cell (MLC), triple level cell (TLC), or quad level cell (QLC). The controller 108 may write data to and read data from NAND flash memory devices at the page level and erase data from NAND flash memory devices at the block level.

A portion of the NVM 110 may be formatted into logical blocks such that a capacity of the NVM 110 is divided into a plurality of zones. Each of the zones comprise a plurality of physical or erase blocks of the NVM 110, and each of the erase blocks are associated a plurality of logical blocks. Each of the logical blocks is associated with a unique LBA or sector. Each of the zones may have a size aligned to the capacity of one or more erase blocks of the NVM 110. When the controller 108 receives a command, such as from a host device 104, the controller 108 can read data from and write data to the plurality of logical blocks associated with the plurality of erase blocks of the NVM 110.

The storage device 106 includes a power supply 111, which may provide power to one or more components of the storage device 106. When operating in a standard mode, the power supply 111 may provide power to the one or more components using power provided by an external device, such as the host device 104. For instance, the power supply 111 may provide power to the one or more components using power received from the host device 104 via the interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The storage device 106 also includes volatile memory 112, which may be used by controller 108 to store information. Volatile memory 112 may be comprised of one or more volatile memory devices. In some examples, the controller 108 may use volatile memory 112 as a cache. For instance, the controller 108 may store cached information in volatile memory 112 until cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

The storage device 106 includes a controller 108, which may manage one or more operations of the storage device 106. For instance, the controller 108 may manage the reading of data from and/or the writing of data to the NVM 110. The controller 108 may comprise zone management (ZM) 120 to manage read and writes to zones, as well relocation of valid data to and from zones for garbage collection purposes. Zone metadata 122 may be stored in either the zone management 120 or the controller 108. In some embodiments, when the storage device 106 receives a write command from the host device 104, the controller 108 may initiate a data storage command to store data to the NVM 110 and monitor the progress of the data storage command. The controller 108 may determine at least one operational characteristic of the storage system 100 and store the at least one operational characteristic to the NVM 110.

The zone metadata 122 stores information about each of the plurality of zones, such as the state of each zone. The zone metadata 122 may be updated by the controller 108 or the ZM 120 to make recommendations to the host device 104 about one or more zones, to inform the host device 104 that one or more zones have been updated or changed, or to inform the host device 104 of events that may have occurred in one or more zones. The zone metadata 122 comprises a plurality of attributes or fields that the controller 108 or ZM 120 may update. For example, the zone metadata 122 may comprise a Writeable Zone Capacity attribute, a Transition Zone to Full Recommendation attribute, a Controller Transitioned Full Zone attribute, a Reset Full Zone Anticipated attribute, as well as data regarding I/O errors, program failures, and any skipped LBAs within a zone, as discussed below with reference to FIGS. 3A-3B.

The controller 108 and/or the ZM 120 are configured to issue an event or notification to inform the host device 104 that the zone metadata 122 has been updated with one or more select attributes (e.g., the Writeable Zone Capacity attribute, the Transition Zone to Full Recommendation attribute, the Controller Transitioned Full Zone attribute, and the Reset Full Zone Anticipated attribute), and that the host device 104 should read or retrieve a list of changes that have occurred to the zone metadata 122. The zone metadata 122 enables the host device 104 to synchronize with the storage device 106 such that the host device 104 is fully aware of any relevant occurrences in storage device 106. For example, the zone metadata 122 allows the host device 104 to be aware of the location of any stored data within the storage device 106 at any given time or any I/O errors that occur while writing data from the host device 104 to the storage device 106.

Figure 2:
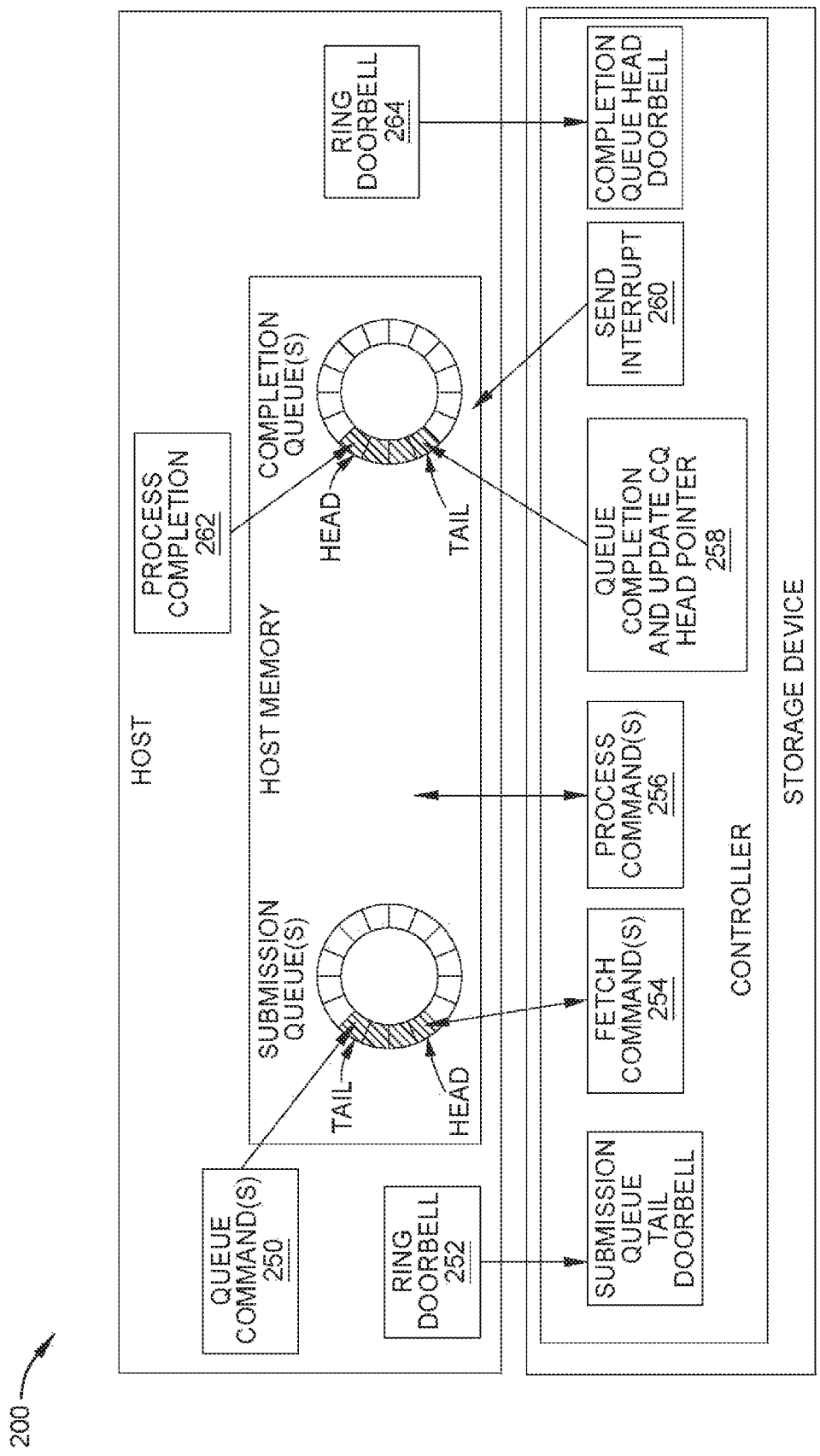
FIG. 2 is a block diagram illustrating a method of operating a storage device to execute a read or write command, according to one embodiment.

FIG. 2 is a block diagram illustrating a method 200 of operating a storage device to execute a read or write command, according to one embodiment. Method 200 may be used with the storage system 100 having a host device 104 and a storage device 106 comprising a controller 108. Method 200 may be used with the device a host device and a storage device comprising a command processor.

Method 200 begins at operation 250, where the host device writes a command into a submission queue as an entry. The host device may write one or more commands into the submission queue at operation 250. The commands may be read commands or write commands. The host device may comprise one or more submission queues. The host device may write one or more commands to the submission queue in any order (i.e., a submission order), regardless of the sequential write order of the one or more commands (i.e., a sequential processing order).

In operation 252, the host device writes one or more updated submission queue tail pointers and rings a doorbell or sends an interrupt signal to notify or signal the storage device of the new command that is ready to be executed. The doorbell signal may be the doorbell 218 of FIG. 2. The host may write an updated submission queue tail pointer and send a doorbell or interrupt signal for each of the submission queues if there are more than one submission queues. In operation 254, in response to receiving the doorbell or interrupt signal, a controller of the storage device fetches the command from the one or more submission queue, and the controller receives or DMA reads the command.

In operation 256, the controller processes the command and writes or transfers data associated with the command to the host device memory. The controller may process more than one command at a time. The controller may process one or more commands in the submission order or in the sequential order. Processing a write command may comprise identifying a zone to write the data associated with the command to, writing the data to one or more LBA of the zone, and advancing a write pointer of the zone to identify the next available LBA within the zone.

In operation 258, once the command has been fully processed, the controller writes a completion entry corresponding to the executed command to a completion queue of the host device and moves or updates the CQ head pointer to point to the newly written completion entry.

In operation 260, the controller generates and sends an interrupt signal or doorbell to the host device. The interrupt signal indicates that the command has been executed and data associated with the command is available in the memory device. The interrupt signal further notifies the host device that the completion queue is ready to be read or processed.

In operation 262, the host device processes the completion entry. In operation 264, the host device writes an updated CQ head pointer to the storage device and rings the doorbell or sends an interrupt signal to the storage device to release the completion entry.

Figure 3A:
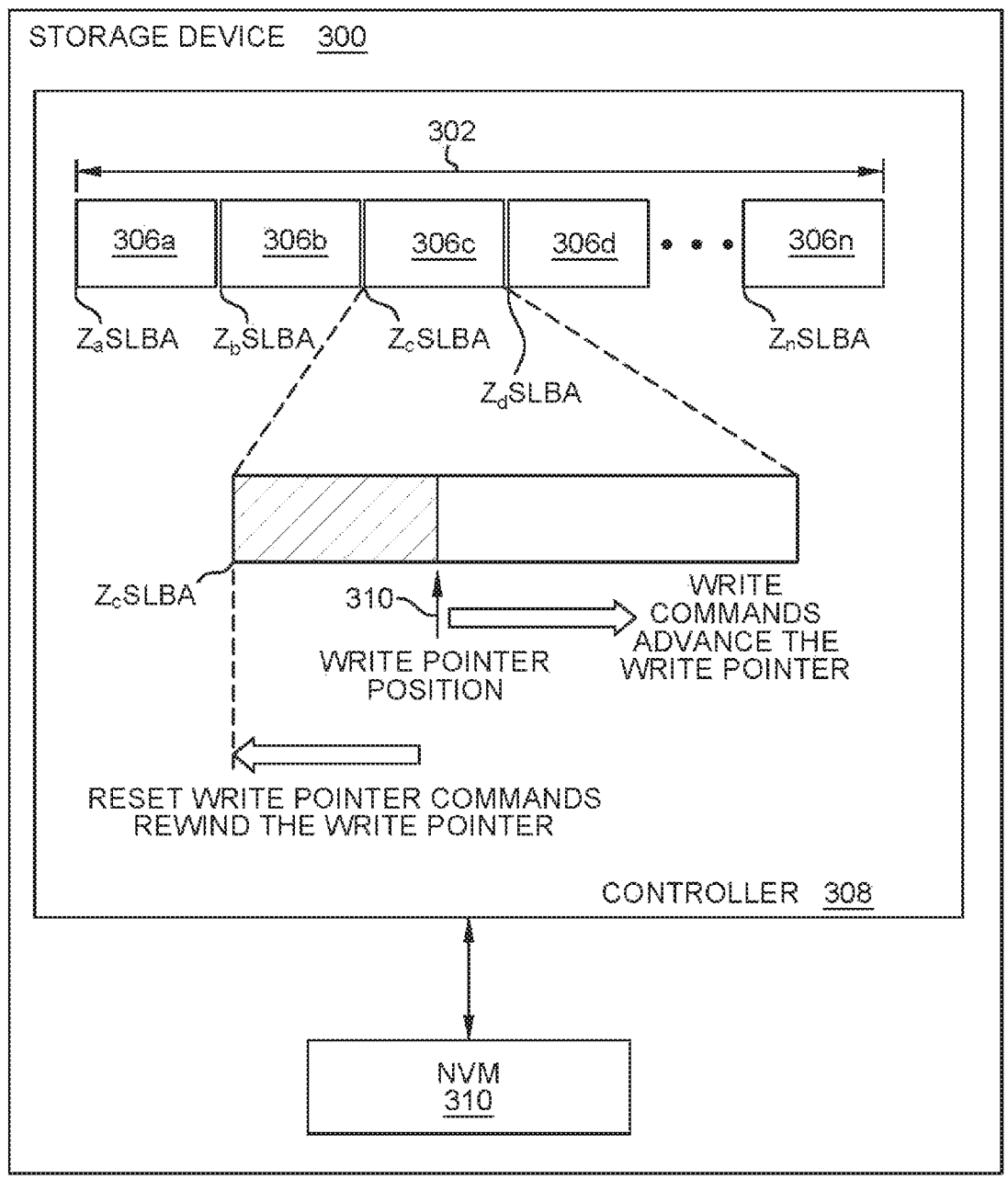
FIG. 3A illustrates a zoned namespaces utilized in a storage device, according to one embodiment.
Figure 3B:
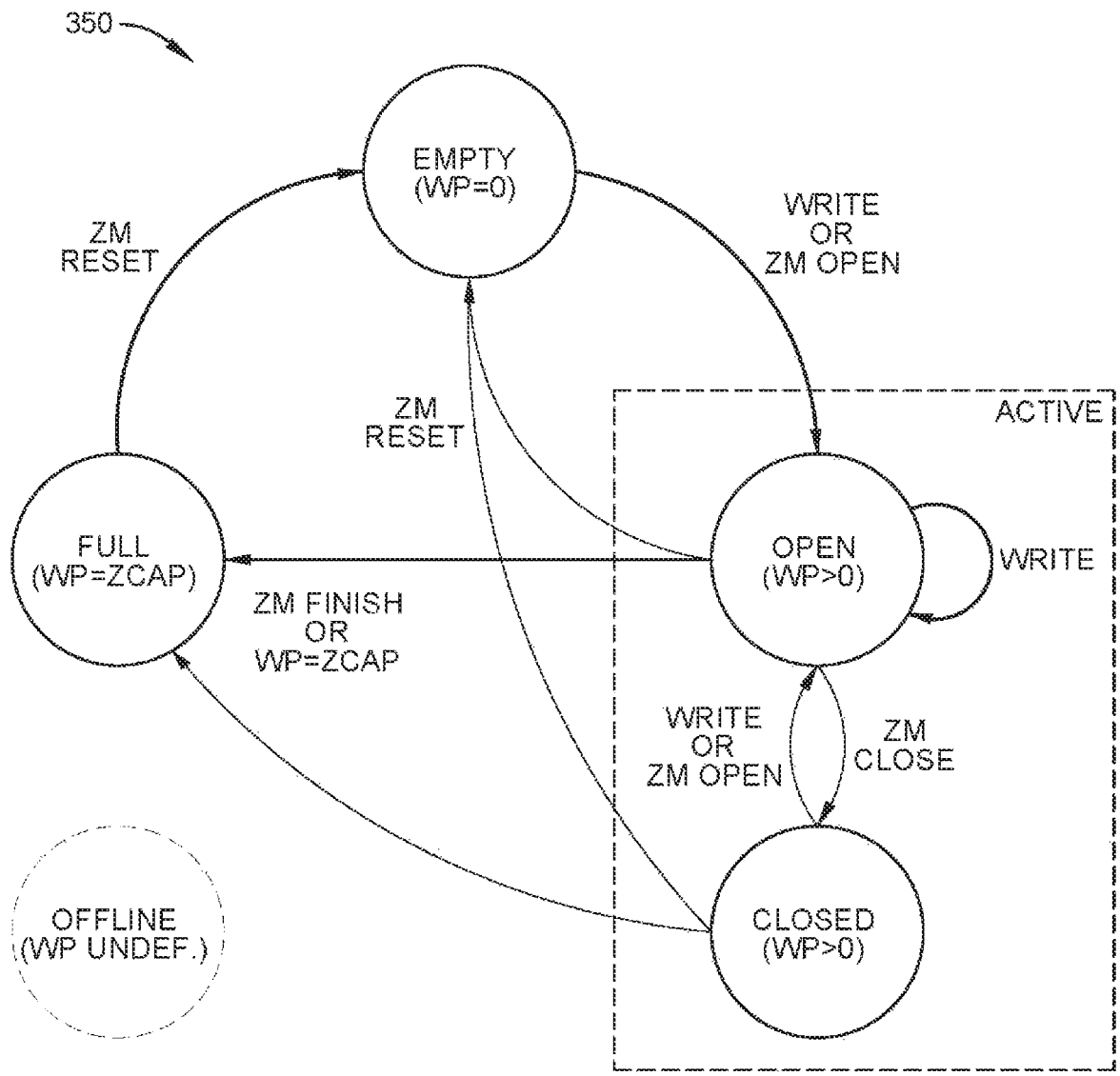
FIG. 3B illustrates a state diagram for the zoned namespaces of the storage device of FIG. 3A, according to one embodiment.

FIG. 3A illustrates a Zoned Namespaces (ZNS) 302 view utilized in a storage device 300, according to one embodiment. The storage device 300 may present the ZNS 302 view to a host device. FIG. 3B illustrates a state diagram 350 for the ZNS 302 of the storage device 300, according to one embodiment. The storage device 300 may be the storage device 106 of the storage system 100 of FIG. 1. The storage device 300 may have one or more ZNS 302, and each ZNS 302 may be different sizes. The storage device 300 may further comprise one or more conventional namespaces in addition to the one or more Zoned Namespaces 302. Moreover, the ZNS 302 may be a zoned block command (ZBC) for SAS and/or a zoned-device ATA command set (ZAC) for SATA.

In the storage device 300, the ZNS 302 is the quantity of NVM that can be formatted into logical blocks such that the capacity is divided into a plurality of zones 306a-306n (collectively referred to as zones 306). Each of the zones 306 comprise a plurality of physical or erase blocks (not shown) of a media unit or NVM 304, and each of the erase blocks are associated a plurality of logical blocks (not shown). Each of the zones 306 may have a size aligned to the capacity of one or more erase blocks of a NVM or NAND device. When the controller 308 receives a command, such as from a host device (not shown) or the submission queue of a host device, the controller 308 can read data from and write data to the plurality of logical blocks associated with the plurality of erase blocks of the ZNS 302. Each of the logical blocks is associated with a unique LBA or sector.

In one embodiment, the NVM 304 is a NAND device. The NAND device comprises one or more dies. Each of the one or more dies comprises one or more planes. Each of the one or more planes comprises one or more erase blocks. Each of the one or more erase blocks comprises one or more wordlines (e.g., 256 wordlines). Each of the one or more wordlines may be addressed in one or more pages. For example, an MLC NAND die may use upper page and lower page to reach the two bits in each cell of the full wordline (e.g., 16 kB per page). Furthermore, each page can be accessed at a granularity equal to or smaller than the full page. A controller can frequently access NAND in user data granularity LBA sizes of 512 bytes. Thus, as referred to in the below description, NAND locations are equal to a granularity of 512 bytes. As such, an LBA size of 512 bytes and a page size of 16 kB for two pages of an MLC NAND results in about 16 NAND locations per wordline. However, the NAND location size is not intended to be limiting, and is merely used as an example.

When data is written to an erase block, one or more logical blocks are correspondingly updated within a zone 306 to track where the data is located within the NVM 304. Data may be written to one zone 306 at a time until a zone 306 is full, or to multiple zones 306 such that multiple zones 306 may be partially full. Similarly, when writing data to a particular zone 306, data may be written to the plurality of erase blocks one block at a time, in sequential order of NAND locations or wordline-by-wordline, until moving to an adjacent block (i.e., write to a first erase block until the first erase block is full before moving to the second erase block), or to multiple blocks at once, in sequential order of NAND locations or wordline-by-wordline, to partially fill each block in a more parallel fashion (i.e., writing the first NAND location of each erase block before writing to the second NAND location of each erase block).

When a controller 308 selects the erase blocks that will store the data for each zone, the controller 308 will be able to choose the erase blocks either at the zone open time, or it may choose the erase blocks as it reaches a need to fill the first NAND location or wordline of that particular erase block. This may be more differentiating when the above described method of filling one erase block completely prior to starting the next erase block is utilized. The controller 308 may use the time difference to select a more optimal erase block in a just-in-time basis. The decision of which erase block is allocated and assigned for each zone and its contiguous LBAs can be occurring for zero or more concurrent zones at all times within the controller 308.

Each of the zones 306 is associated with a zone starting logical block address (ZSLBA) or zone starting sector. The ZSLBA is the first available LBA in the zone 306. For example, the first zone 306a is associated with $Z_a$SLBA, the second zone 306b is associated with $Z_b$SLBA, the third zone 306c is associated with $Z_c$SLBA, the fourth zone 306d is associated with $Z_d$SLBA, and the $n^{th}$ zone 306n (i.e., the last zone) is associated with $Z_n$SLBA. Each zone 306 is identified by its ZSLBA, and is configured to receive sequential writes (i.e., writing data to the NVM 110 in the order the write commands are received).

As data is written to a zone 306, a write pointer 310 is advanced or updated to point to or to indicate the next available block in the zone 306 to write data to in order to track the next write starting point (i.e., the completion point of the prior write equals the starting point of a subsequent write). Thus, the write pointer 310 indicates where the subsequent write to the zone 306 will begin. Subsequent write commands are 'zone append' commands, where the data associated with the subsequent write command appends to the zone 306 at the location the write pointer 310 is indicating as the next starting point. An ordered list of LBAs within the zone 306 may be stored for write ordering. Each zone 306 may have its own write pointer 310. Thus, when a write command is received, a zone is identified by its ZSLBA, and the write pointer 310 determines where the write of the data begins within the identified zone.

FIG. 3B illustrates a state diagram 350 for the ZNS 302 of FIG. 3A. In the state diagram 350, each zone may be in a different state, such as empty, active, full, or offline. When a zone is empty, the zone is free of data (i.e., none of the erase blocks in the zone are currently storing data) and the write pointer is at the ZSLBA (i.e., WP=0). An empty zone switches to an open and active zone once a write is scheduled to the zone or if the zone open command is issued by the host. Zone management (ZM) commands can be used to move a zone between zone open and zone closed states, which are both active states. If a zone is active, the zone comprises open blocks that may be written to, and the host may be provided a description of recommended time in the active state. The controller 308 comprises the ZM. Zone metadata may be stored in the ZM and/or the controller 308.

The term "written to" includes programming user data on 0 or more NAND locations in an erase block and/or partially filled NAND locations in an erase block when user data has not filled all of the available NAND locations. The term "written to" may further include moving a zone to full due to internal drive handling needs (open block data retention concerns because the bits in error accumulate more quickly on open erase blocks), the storage device 300 closing or filling a zone due to resource constraints, like too many open zones to track or discovered defect state, among others, or a host device closing the zone for concerns such as there being no more data to send the drive, computer shutdown, error handling on the host, limited host resources for tracking, among others.

The active zones may be either open or closed. An open zone is an empty or partially full zone that is ready to be written to and has resources currently allocated. The data received from the host device with a write command or zone append command may be programmed to an open erase block that is not currently filled with prior data. A closed zone is an empty or partially full zone that is not currently receiving writes from the host in an ongoing basis. The movement of a zone from an open state to a closed state allows the controller 308 to reallocate resources to other tasks. These tasks may include, but are not limited to, other zones that are open, other conventional non-zone regions, or other controller needs.

In both the open and closed zones, the write pointer is pointing to a place in the zone somewhere between the ZSLBA and the end of the last LBA of the zone (i.e., WP>0). Active zones may switch between the open and closed states per designation by the ZM, or if a write is scheduled to the zone. Additionally, the ZM may reset an active zone to clear or erase the data stored in the zone such that the zone switches back to an empty zone. Once an active zone is full, the zone switches to the full state. A full zone is one that is completely filled with data, and has no more available blocks to write data to (i.e., WP=zone capacity (ZCAP)). In a full zone, the write pointer points to the end of the writeable capacity of the zone. Read commands of data stored in full zones may still be executed.

The zones may have any total capacity, such as 256 MiB or 512 MiB. However, a small portion of each zone may be inaccessible to write data to, but may still be read, such as a portion of each zone storing the XOR data and one or more excluded erase blocks. For example, if the total capacity of a zone 306 is 512 MiB, the ZCAP may be 470 MiB, which is the capacity available to write data to, while 42 MiB are unavailable to write data. The writeable capacity (ZCAP) of a zone is equal to or less than the total zone storage capacity. The storage device 300 may determine the ZCAP of each zone upon zone reset. For example, the controller 308 or the ZM may determine the ZCAP of each zone. The storage device 300 may determine the ZCAP of a zone when the zone is reset.

An attribute of Writeable ZCAP is added to the zone metadata, and the storage device 300 may update the Writeable ZCAP attribute to indicate the writeable capacity of a zone 306 to the host device. The host device may read the attribute of Writeable ZCAP from the zone metadata to determine the storage device selected ZCAP of a zone 306, and thus, the host device is aware of how much data may be stored in the zone 306. The storage device 300 may update the Writeable ZCAP attribute, which is applied to each of the zones 306. Upon updating the zone metadata with the ZCAP attribute, the controller 308 and/or the ZM, may issue an event to inform the host device that the zone metadata has changed.

The ZCAP of a zone 306 may be selected to align to the capacity of the physical media boundaries, such as to one or more erase blocks, which allows the host device and the storage device 300 to collaborate when writing data. All the data stored in a zone 306 will either be valid or invalid, and the host device tracks the status of the data independently of the storage device. As a result, the storage device does not have to move data to free up erase blocks for new writes, as the host application or host device now manages this process. Thus, the device-side write amplification factor is eliminated.

The ZM may reset a full zone, scheduling an erasure of the data stored in the zone such that the zone switches back to an empty zone. When a full zone is reset, the zone may not be immediately cleared of data, though the zone may be marked as an empty zone ready to be written to. However, the reset zone must be erased prior to switching to an open and active zone. A zone may be erased any time between a ZM reset and a ZM open. Upon resetting a zone, the storage device 300 may determine a new ZCAP of the reset zone and update the Writeable ZCAP attribute in the zone metadata. An offline zone is a zone that is unavailable to write data to. An offline zone may be in the full state, the empty state, or in a partially full state without being active.

Since resetting a zone clears or schedules an erasure of all data stored in the zone, the need for garbage collection of individual erase blocks is eliminated, improving the overall garbage collection process of the storage device 300. The storage device 300 may mark one or more erase blocks for erasure. When a new zone is going to be formed and the storage device 300 anticipates a ZM open, the one or more erase blocks marked for erasure may then be erased. The storage device 300 may further decide and create the physical backing of the zone upon erase of the erase blocks. Thus, once the new zone is opened and erase blocks are being selected to form the zone, the erase blocks will have been erased. Moreover, each time a zone is reset, a new order for the LBAs and the write pointer 310 for the zone 306 may be selected, enabling the zone 306 to be tolerant to receive commands out of sequential order. The write pointer 310 may optionally be turned off such that a command may be written to whatever starting LBA is indicated for the command.

Referring back to FIG. 3A, when the controller 308 receives a write command from the host or direct memory access (DMA) reads the write data, the controller 308 may select an empty erase block to write the data associated with the command to, and the empty zone 306 switches to an active and open zone 306. The write command may be a command to write new data, or a command to move valid data to another zone for garbage collection purposes. The controller 308 is configured to DMA read or pull-in new commands from a submission queue populated by a host device.

In an empty zone 306 just switched to an active zone 306, the data is assigned to the zone 306 and the associated set of sequential LBAs of the zone 306 starting at the ZSLBA, as the write pointer 310 is indicating the logical block associated with the ZSLBA as the first available logical block. The data may be written to one or more erase blocks or NAND locations that have been allocated for the physical location of the zone 306. After the data associated with the write command has been written to the zone 306, a write pointer 310 is updated to point to the next LBA available for a host write (i.e., the completion point of the first write). The write data from this host write command is programmed sequentially into the next available NAND location in the erase block selected for physical backing of the zone.

In some embodiments, a NAND location may be equal to a wordline. In such an embodiment, if the write command is smaller than a wordline, the controller may optionally aggregate several write commands in another memory location such as DRAM or SRAM prior to programming a full wordline composed of multiple write commands. Write commands that are longer than a wordline will be able to program and fill a complete wordline with some of the data, and the excess data beyond a wordline will be used to fill the next wordline. For the purposes of this description, the write data sizes are equal to a NAND location of 512 bytes; however, this is not intended to be limiting.

For example, the controller 308 may receive a first write command to a third zone 306c, or a first zone append command. The host identifies sequentially which logical block of the zone 306 to write the data associated with the first command to. The data associated with the first command is then written to the first or next available LBA(s) in the third zone 306c as indicated by the write pointer 310, and the write pointer 310 is advanced or updated to point to the next available LBA available for a host write (i.e., WP>0). If the controller 308 receives a second write command to the third zone 306c, or a second zone append command, the data associated with the second write command is written to the next available LBA(s) in the third zone 306c identified by the write pointer 310. Once the data associated with the second command is written to the third zone 306c, the write pointer 310 once again advances or updates to point to the next available LBA available for a host write. Resetting the third zone 306c moves the write pointer 310 back to the Z$_c$SLBA (i.e., WP=0), and the third zone 306c switches to an empty zone.

Writing user data to erase blocks or NAND locations of a zone (i.e., programming a cell) is done by pulsing electrons into the cell until the voltage of the cell is within the range for a given logical state. The voltage can only increase, and must be emptied (i.e., through a flash block erase) before the cell can be programmed again. Programming is an energy-consuming process, which may cause charges to flow to neighboring cells, thus possibly changing the logical state of the neighboring cell.

To reduce charge leaks to nearby cells, two-step programming of cells may be utilized. In two-step programming for multi-level cells (MLC), for example, a first program is executed on the lower bit of a first cell (i.e., a high-energy coarse-grained program), and then a second program is executed on the upper bit of the first cell (i.e., a low-energy fine-grained program). Between programming the lower and upper bits of the first cell, the lower bit of a neighboring second cell is programmed. If there has been cell-to-cell interference, the fine-grained programming of the first cell can sense the current-voltage of the neighboring second cell and only pulse the necessary energy for the required logical state. Meanwhile, cells that have not been programmed by the fine-grained program are unreadable, which results in the host data being unreadable until the fine-grained program is completed.

Another tradeoff when using two-step programming is that the cells in a partially programmed state are more prone to program interference and read disturbs, which influences the ability to read the appropriate voltage of a cell in the fine-grained programming step—leading to an invalid logical state being stored. Errors such as charge leakage and read/program disturbs cause the logical state of cells to change as a result of electrons leaving or entering the cells.

Open zones, such as described above in FIG. 3B, are prone to errors from read disturbs, the two-step programming model, and/or other physical properties of the media, which can cause the storage device 300 to have to set aside or pad a set of erase blocks to maintain reliability in order to compensate for such errors. Open zones experiencing errors can causes a zone to be prematurely transitioned to the full state by the controller 308, thus reducing the number of writes to the media. In such cases, the host device does not have an opportunity to fill the zone 306 with user data, resulting in wasted write capacity.

However, the storage device 300 utilizing ZNS 302 may collaborate with the host device such that the host device can be aware of soon-to-be finished zones or controller finished zones, allowing the host device to be informed early and to place data in the open zone if necessary. To accommodate the collaboration between the storage device 300 and the host device, two new attributes or fields are added to the zone metadata to be executed on an open zone: Transition Zone to Full Recommendation and Controller Transitioned Full Zone. The controller 308 can inform the host device that the storage device 300 intends to transition an open zone to the full state, and later, if the host does not respond, can autonomously transition an open zone to the full state. For example, the controller 308 and/or the ZM of the storage device 300 may autonomously transition the open zone after a predetermined amount of time if the host device does not transition the open zone to the full state. If the controller 308 initiates the transition, the Controller Transitioned Full Zone attribute will be updated.

The attributes of Transition Zone to Full Recommendation and Controller Transitioned Full Zone can be updated at any time while a zone is in the open state, and as such, the storage device 300 makes use of notifications through the Asynchronous Event Notifications framework in the NVM Express specification. Whenever the values or attributes of Transition Zone to Full Recommendation and Controller Transitioned Full Zone are updated, the storage device 300 may issue an event which informs the host device that the zone metadata has changed. The host device should then retrieve a list of changes and perform any mitigations that the host device deems necessary.

Similarly, full zones, such as described above in FIG. 3B, must be rewritten at some point due to read disturbs and charge leaks. When a full zone must be rewritten, all the data is valid from the point of view of the storage device 300. Typically, the storage device 300 would have to read all the data from the erase blocks that back the specific full zone (e.g., the first zone 306a) and rewrite the data to a new set of erase blocks in a different zone (e.g., the second zone 306b) while maintaining the full state of the zone (e.g., the first zone 306a) to the host device. Given that rewriting full zones is an expensive operation, the host device can be informed when a full zone must be rewritten and take action.

The attribute or field of Reset Full Zone Anticipated is added to the zone metadata to alert the host device that a full zone should be reset. The controller 308 can set the Reset Full Zone Anticipated attribute or bit to inform the host device that it recommends the host device to rewrite the data, or autonomously reset the full zone if the data is no longer valid to the host device. As such, the storage device 300 and the host device may collaborate on the traditional garbage collection process, eliminating unnecessary rewrites and improving the overall performance of the storage device 300.

If the host device does not reset the full zone (i.e., due to not having a need for the data, or if the data has been rewritten elsewhere), the storage device 300 can refresh or reset the data internally and update the Reset Full Zone Anticipated attribute such that the host device is informed that it should no longer try to refresh or reset the data. For example, the controller 308 of the storage device 300 may reset the full zone after a predetermined amount of time if the host device does not rewrite the data. Since resetting or rewriting a zone takes less than a second, the race condition between the storage device and the host device relocating data from a zone simultaneously is unlikely.

Moreover, the ZNS 302 introduces a strict write ordering which may cause the host writes to degenerate to single write I/O per zone 306. As such, writes to a zone 306 must be sequential, and rewriting a zone 306 requires that the zone 306 is first reset. Issuing any I/Os that do not adhere to the strict write ordering results in I/O errors by the controller.

When a storage device 300 utilizing ZNS 302 returns a write error to the host device, the returned errors are located within a single zone. Thus, the blast radius is limited, and therefore an I/O error is not considered fatal. The ZNS 302 allows I/O errors to be returned on writes, and the storage device makes informed use of the I/O errors. Any errors that occur may be recorded in the zone metadata. As such, the errors provide additional information to the storage device 300 that the storage device 300 can communicate to the host device. The host device may read the zone metadata to determine why the error occurred as well as the cause of the error, and to determine precisely which erase blocks or NAND locations were affected by the error. The host device then knows to forgo storing data at the locations where the error occurred.

For example, if the storage device 300 experiences an error or program failure when writing to an LBA in a zone 306, the write pointer may skip ahead one or more LBAs to advance to the next valid LBA that is available for storing data. The host device can then read the zone metadata to determine how many LBAs were skipped to resync with the storage device 300 and start writing data at the next valid LBA indicated by the write pointer. Thus, rather than the storage device 300 masking the error from the host device and managing the error on the backend, the storage device 300 can alert the host device not to store data in the one or more LBAs that experienced an error or program failure. As such, the host device will always be aware of the location where the data is stored.

In another example, if the storage device 300 experiences an error or program failure when writing to an LBA in a zone, the storage device 300 may determine that the entire zone 306 is unsuitable to store data. If an open zone 306 is no longer suitable to store data, the storage device 300 may transition the unsuitable zone 306 to the full state and update the attribute of Controller Transitioned Full Zone in the zone metadata to alert the host device that the zone 306 has been transitioned to the full state. The host device then knows that the transitioned zone 306 is not available to store data, and may write data to a new zone 306 of the host device's choice.

By making informed use of I/O errors or program failure, the host device and the storage device 300 collaborate on data placement, and the host device is able to align data that has the same temperature to stay together, eliminating expensive garbage collection routines as found in conventional SSDs and reducing the device write amplification factor. Moreover, the storage device 300 can alert the host device to either not store data in the one or more LBAs that experienced an error or program failure or that an open zone has been transitioned to the full state and can no longer be used to store data. As such, the host device is constantly aware of the location where the data is being stored.

Moreover, by utilizing attributes in the zone metadata to inform the host device of what is happening on the drive side, the device-side write amplification factor and the over-provisioning of a drive set aside for improving garbage collection can both be eliminated, increasing the storage capacity for the host device to use. Additionally, the storage device and the host device may collaborate on the traditional garbage collection process, eliminating unnecessary rewrites and improving the overall performance of the storage device.

In one embodiment, a storage device comprises a media unit. A capacity of the media unit is divided into a plurality of zones. The media unit comprises a plurality of dies, each of the plurality of dies comprising a plurality of erase blocks. The storage device further comprises a controller coupled to the media unit, the controller configured to update zone metadata to recommend to a host device to reset one or more full zones of the plurality of zones, update the zone metadata to recommend to the host device to transition one or more open zones of the plurality of zones to a full state, transition the one or more open zones to the full state, and update the zone metadata to alert the host device that the one or more open zones have been transitioned to the full state.

The controller is configured to issue an event to inform the host device that the zone metadata has changed upon updating an attribute in the zone metadata of Reset Full Zone Anticipated, Transition Zone to Full Recommendation, or Controller Transitioned Full Zone. The zone metadata is updated with an attribute of Reset Full Zone Anticipated to recommend to the host device to reset the one or more full zones. The zone metadata is updated with an attribute of Transition Zone to Full Recommendation to recommend to the host device to transition the one or more open zones to the full state. The zone metadata is updated with an attribute of Controller Transitioned Full Zone to alert the host device that the one or more open zones have been transitioned to the full state. The controller is further configured to autonomously reset the one or more full zones when data stored in the one or more full zones is no longer valid. The controller is further configured to update the zone metadata to recommend to the host device to reset the one or more full zones when the one or more full zones are affected by read disturbs or charge leaks, and update the zone metadata to recommend to the host device to transition the one or more open zones to the full state upon determining the one or more zones are unsuitable to store data.

In another embodiment, a storage device comprises a media unit. A capacity of the media unit is divided into a plurality of zones. The media unit comprises a plurality of dies, each of the plurality of dies comprising a plurality of erase blocks. The storage device further comprises a controller coupled to the media unit, the controller configured to determine a writeable zone capacity of each of the plurality of zones, the writeable zone capacity being equal to or less than a total zone storage capacity of each zone, wherein the writeable capacity of each zone is aligned with a capacity of one or more erase blocks, and update zone metadata to notify a host device of the writeable zone capacity of each of the plurality of zones.

The controller updates a Writeable ZCAP attribute in the zone metadata to notify the host device of the writeable zone capacity. The writeable zone capacity of at least one zone is less than the total zone storage capacity of the at least one zone. The at least one zone having a writeable zone capacity less than the total zone storage capacity comprises a readable portion that is inaccessible to write data to. The readable portion of the at least one zone stores XOR data. The controller is configured to determine the writeable zone capacity of each zone upon zone reset. The controller is configured to issue an event to inform the host device that the zone metadata has changed upon updating a Writeable ZCAP attribute in the zone metadata.

In one embodiment, a storage device comprises a media unit. A capacity of the media unit is divided into a plurality of zones. The media unit comprises a plurality of dies, each of the plurality of dies comprising a plurality of erase blocks. The storage device further comprises a controller coupled to the media unit, the controller configured to receive a write command to write data to one or more first logical block addresses in a first zone of the plurality of zones, upon experiencing an error while writing the data to the one or more first logical block addresses in the first zone, update a write pointer of the first zone to point to a next valid logical block address in the first zone; and update zone metadata to indicate the one or more first logical block addresses were skipped and to indicate the next valid logical block address is available to store the data in the first zone.

The media unit is a non-volatile memory device. Updating the zone metadata to indicate the one or more first logical block addresses were skipped alerts a host device that the one or more first logical block addresses are unable to store data. Upon experiencing an error while writing data to one or more second logical block addresses in a second zone, the controller is configured to determine the second zone is unsuitable to store the data. The controller is further configured to transition the second zone to a full state, and update the zone metadata to alert a host device that the second zone has been transitioned to the full state. The zone metadata is updated with an attribute of Controller Transitioned Full Zone to alert the host device that the second zone has been transitioned to the full state. The controller is further configured to issue an event to inform the host device that the zone metadata has changed upon updating the zone metadata with the attribute of Controller Transitioned Full Zone.

While the foregoing is directed to embodiments of the present disclosure, other and further embodiments of the disclosure may be devised without departing from the basic scope thereof, and the scope thereof is determined by the claims that follow.

What is claimed is:

1. A storage device, comprising:
   a media unit, wherein a capacity of the media unit is divided into a plurality of zones, each zone having a writeable capacity for storing data, and wherein the media unit comprises a plurality of dies, each of the plurality of dies comprising a plurality of erase blocks; and
   a controller coupled to the media unit, the controller comprising a zone management for storing zone metadata of the plurality of zones, wherein the controller is configured to:
   update the zone metadata to recommend to a host device to reset one or more full zones of the plurality of zones;
   update the zone metadata to recommend to the host device to transition one or more open zones of the plurality of zones to a full state prior to the one or more zones reaching the writeable capacity;
   transition the one or more open zones to the full state; and
   update the zone metadata to alert the host device that the one or more open zones have been transitioned to the full state.

2. The storage device of claim 1, wherein the controller is configured to issue an event to inform the host device that the zone metadata has changed upon updating an attribute in the zone metadata of Reset Full Zone Anticipated, Transition Zone to Full Recommendation, or Controller Transitioned Full Zone.

3. The storage device of claim 1, wherein the zone metadata is updated with an attribute of Reset Full Zone Anticipated to recommend to the host device to reset the one or more full zones.

4. The storage device of claim 1, wherein the zone metadata is updated with an attribute of Transition Zone to Full Recommendation to recommend to the host device to transition the one or more open zones to the full state.

5. The storage device of claim 1, wherein the zone metadata is updated with an attribute of Controller Transitioned Full Zone to alert the host device that the one or more open zones have been transitioned to the full state.

6. The storage device of claim 1, wherein the controller is further configured to autonomously reset the one or more full zones when data stored in the one or more full zones is no longer valid.

7. The storage device of claim 1, wherein the controller is further configured to:
   update the zone metadata to recommend to the host device to reset the one or more full zones when the one or more full zones are affected by read disturbs or charge leaks; and
   update the zone metadata to recommend to the host device to transition the one or more open zones to the full state upon determining the one or more zones are unsuitable to store data.

8. The storage device of claim 1, wherein each zone of the plurality of zones comprises one or more erase blocks of the plurality of erase blocks.

9. The storage device of claim 1, wherein the controller transitions the one or more open zones to the full state after a predetermined amount of time has passed after updating the zone metadata to recommend to the host device to transition the one or more open zones to the full state.

* * * * *